United States Patent [19]

Ezekiel

[11] 4,135,407

[45] Jan. 23, 1979

[54] METHOD AND APPARATUS FOR OVERRANGE PROTECTION OF THE TRANSDUCER IN A DIFFERENTIAL PRESSURE TRANSMITTER

[75] Inventor: Frederick D. Ezekiel, Lexington, Mass.

[73] Assignee: The Foxboro Company, Foxboro, Mass.

[21] Appl. No.: 892,811

[22] Filed: Apr. 3, 1978

[51] Int. Cl.² .............................................. G01L 9/00
[52] U.S. Cl. ........................................ 73/717; 73/706
[58] Field of Search ................. 73/706, 716, 717, 718, 73/719, 720, 721, 722

[56] References Cited

U.S. PATENT DOCUMENTS

| | | | |
|---|---|---|---|
| 3,058,350 | 10/1962 | Brown | 73/720 |
| 3,313,158 | 4/1967 | Giovanni | 73/720 |
| 3,756,085 | 9/1973 | Hunter | 73/720 |
| 4,028,945 | 6/1977 | Bergamini | 73/720 |

Primary Examiner—Donald O. Woodiel
Attorney, Agent, or Firm—Andrew T. Karnakis; Richard J. Birch

[57] ABSTRACT

A method and apparatus for protecting the transducer in a liquid-filled differential pressure transmitter having stroke limited, isolation diaphragms from exposure to overrange pressure are disclosed. Bidirectional overrange pressure protection is provided through the use of a single, preloaded bellows that is restrained by a preloaded stop means preferably including a preloaded mechanical spring. The bellows remains stationary when the differential pressure transmitter is exposed to a normal, operational differential pressure. When an overrange pressure is applied to the transmitter, the bellows expands or contracts to accommodate the liquid displaced by either of the isolation diaphragms thereby protecting the transducer from the overrange pressure. Upon removal of the overrange pressure condition, the protection apparatus automatically resets itself.

17 Claims, 10 Drawing Figures

METHOD AND APPARATUS FOR OVERRANGE PROTECTION OF THE TRANSDUCER IN A DIFFERENTIAL PRESSURE TRANSMITTER

BACKGROUND OF THE INVENTION

1. Field of Invention

The present invention relates to differential pressure transmitters in general and, more specifically to a method and apparatus for providing overrange pressure protection for the transducer in a differential pressure transmitter.

2. Description of the Prior Art

Differential pressure transmitters are extensively used in process controls. Frequently they measure a small differential pressure at high static pressure levels. For example, it is common to measure a 3 PSI differential pressure at 1000 PSI static level. Most electrical transducers such as, semiconductor chips, that are capable of responding to small pressures are damaged when subjected to full static pressure on one side. In order to prevent such damage, many differential pressure transmitters incorporate a means for protecting the sensitive electrical transducer from overrange pressures. One commonly employed overrange pressure protection method uses isolation diaphragms between the electrical transducer and the process fluids. The volume between the isolation diaphragms and the transducer is filled with an incompressible liquid. It is customary to provide a mechanical back-up stop for the isolation diaphragm in order to limit the volume of the liquid transferred from the high pressure side to the low pressure side. Most pressure transducers and specifically the currently employed semiconductor pressure responsive chips are mechanically too rigid to accomodate the liquid transferred without permanent damage to the chip. Therefore, auxiliary methods have been proposed to limit the differential pressure applied to the transducer within a pressure range that will not produce a deleterious effect on the transducer.

An early auxiliary protection method is described in U.S. Pat. No. 3,058,350, issued Oct. 16, 1962, to G. S. Brown for a Differential Pressure Transmitter. In the Brown patent, the transducer is protected from overrange pressure by means of two preloaded bellows. These bellows remain undeflected when the transmitter is exposed to a differential pressure within the operating range of the transducer. However, when the differential pressure on one side of the transmitter exceeds a predetermined level determined by the preload on the associated bellow, the bellows begins to move in order to accomodate the transfer of the liquid from behind one of the isolation diaphragms or bellows to the other.

Although, the dual bellows protection system disclosed in the Brown patent produces adequate overrange pressure protection, it achieves this protection at the expense of transmitter accuracy because of the additional volume required by two bellows. Typically, silicone oil is employed as the liquid filling the volume between the two isolation diaphragms and the two bellows. As the oil undergoes temperature excursion during use of the transmitter, the oil volume changes and unevenly deflects the isolation diaphragms. The non-symmetrical deflection of the two isolation diaphragms produces an undesirable zero-offset error for the transmitter.

In order to reduce this type of inaccuracy, the fluid volume between the two isolation diaphragms should be held to a minimum. Since this volume includes the volume of the overrange pressure protection device, it follows that the volume of the protection device also should be held to a minimum. The use of the dual bellows system shown in the Brown patent does not achieve the desired minimum volume between the isolation diaphragms.

Another example of a prior art overrange pressure protection device is depicted in U.S. Pat. No. 3,756,085, issued Sept. 4, 1973, to Richard C. Hunter for Differential Pressure Transmitter Overrange Protection. In the Hunter device a magnetic breakaway coupling is employed to maintain a bellows substantially rigid during the normal operating pressure range of the differential pressure transmitter. When the force on the breakaway coupling exceeds the limit, the bellows deflects to allow the transfer of liquid from behind one isolation diaphragm to the other thereby limiting the differential pressure across the transducer to a safe level.

The use of a magnetic breakaway coupling not only requires an undersirable extra volume in order to achieve overrange protection, but also suffers from the lack of any return force to provide an automatic resetting of the protective device. In Hunter, a pressure is needed in one direction to return the magnetic breakaway coupling to its "set" position. If bidirectional protection is desired, the Hunter system suggests the use of two-magnetic breakaway couplings. This configuration further complicates the structure of the protective device, requires additional volume and pressures in two directions to provide automatic resetting of the device. From a practical standpoint, these disadvantages produce a significant deterrent to commercial use of the Hunter device. Although the previously mentioned Brown patent illustrates an overrange pressure protective device with an automatic reset feature through the use of two preloaded bellows, this feature is achieved at the sacrifice of minimum volume between the two isolation diaphragms.

U.S. Pat. No. 4,028,945, issued June 14, 1977 to G. Bergamine, illustrates an overrange pressure protection system for differential pressure transmitters that utilizes a movable bidirectionally compressible, preloaded spring positioned within an unloaded bellows. In operation, the movable spring seats against different surfaces depending upon the direction of the overrange pressure. Any inaccuracy in the location of these surfaces and the lack of repeatability of spring seating with respect to the surfaces can cause unacceptable zero-offset errors. Furthermore, the movement of the spring from one seating surface to another seating surface produces an undesirable "deadband" in the system.

SUMMARY OF THE INVENTION

It is a general object of the invention to provide an improved overrange pressure protection method and apparatus for the transducer of a differential pressure transmitter without sacrificing the accuracy of the transmitter.

It is a specific object of the invention to provide an overrange pressure protection apparatus that minimizes the liquid fill volume between the isolation diaphragms of a differential pressure transmitter.

It is another object of the invention to provide an automatically resettable overrange pressure protective apparatus for the transducer of a differential pressure transmitter.

It is a feature of the invention that these objects can be achieved with a single, reliable and inexpensive device.

In accordance with the present invention a relatively rigid differential pressure transducer, isolated from the environment by an incompressible liquid and soft isolation diaphragms, is protected from overrange pressures by a single preloaded bellows that is restrained by a preloaded stop means preferably including a preloaded mechanical spring. The bellows is located in parallel with the transducer and remains in an undeflected state as long as the transmitter is exposed to a safe level of differential pressure. However, depending on the preloads of the spring and bellows, the bellows deflects in either direction when certain differential pressure levels are applied to the transmitter. The movement of the bellows permits the transfer of liquid from behind one of the isolation diaphragms to the other. When either of the isolation diaphragms rests on its respective back-up plate no further liquid transfer can occur thereby preventing additional differential pressure build-up. Upon removal of the overrange pressure condition, the preloaded stop means and bellows automatically return to their normal preloaded null position.

BRIEF DESCRIPTION OF THE DRAWINGS

The objects and features of the invention will best be understood from a detailed description of a preferred embodiment selected for purposes of illustration, and shown in the following drawings, in which.

Figure 1:
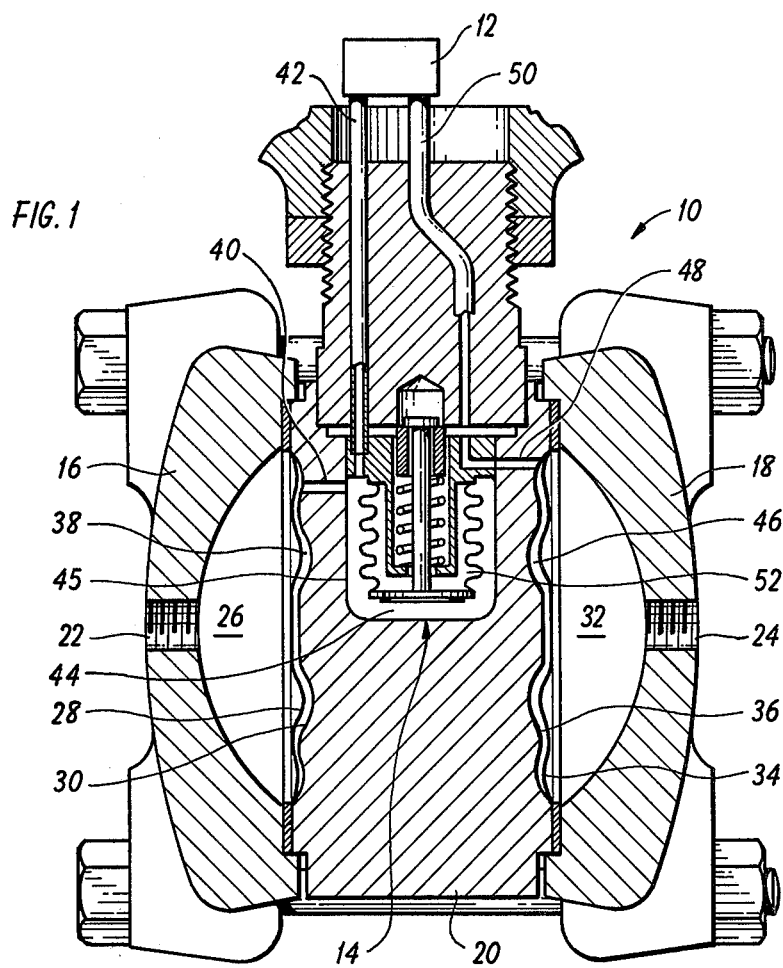
FIG. 1 is a view in partial cross-section of a differential pressure transmitter that contains an overrange pressure protection apparatus constructed in accordance with the present invention.

Turning now to the drawings and particularly to FIG. 1 thereof, there is shown in partial cross-section a conventional differential pressure transmitter, indicated generally by the reference numeral 10. The transmitter 10 includes an electrical pressure transducer 12 and an overrange pressure protection apparatus that is constructed in accordance with the present invention and indicated generally by the reference numeral 14.

The structure of the differential pressure transmitter 10 is well know to those skilled in the art and need only be described in general terms in order to provide a frame of reference for the overrange pressure protection apparatus 14. The differential pressure transmitter 10 has two general symmetrical, rigid, inlet covers 16 and 18 that are mounted with respect to a back-up plate 20. The inlet covers 16 and 18 have threaded process pressure inlets 22 and 24, respectively. The threaded inlet 22 communicates with a high pressure process fluid chamber 26 that is defined by the inner wall of cover 16 and a soft, flexible, convoluted isolation diaphragm 28. The isolation diaphragm 28 is mounted between the inner wall of inlet cover 16 and the convoluted surface 30 of back-up plate 20.

The low pressure side of the differential pressure transmitter 10 includes a corresponding low pressure process fluid chamber 32 formed by the inner wall of cover 18 and another soft, flexible, convoluted isolation diaphragm 34. The low pressure side isolation diaphragm 34 is mounted between the inner wall of inlet cover 18 and the convoluted surface 36 of back-up plate 20. The back-up plate surfaces 30 and 36 limit the movement of the flexible isolation diaphragms 28 and 34, respectively, when excessive overrange pressures are applied to the differential transmitter through the threaded high and low pressure inlets 22 and 24, respectively.

The high pressure isolation diaphragm 28 and back-up plate surface 30 together define a high pressure fill fluid chamber 38 that is in fluid communication through passageway 40 with the high pressure side 42 of the electrical transducer 12 and the high pressure side 44 of the overrange pressure protection apparatus 14 which, itself, is located within a central cavity 45. In a similar manner, the low pressure isolation diaphragm 34 and the back-up plate surface 36 define a low pressure fill fluid chamber 46 that is in fluid communication through passageway 48 with the low pressure side 50 of transducer 12 and the low pressure side 52 of the overrange pressure protection apparatus 14.

Although the terms "high" and "low" have been used to designate the left and right sides, respectively, of the differential pressure transmitter as shown in FIG. 1, it will be understood by those skilled in the art that this designation is merely illustrative and that the respective "high" and "low" pressure designations can be reversed. Those skilled in the art will also appreciate that the pressure signals applied to the overrange protection apparatus 14 can be applied through the isolation diaphragms or other suitable pressure limiting means.

Figure 2:
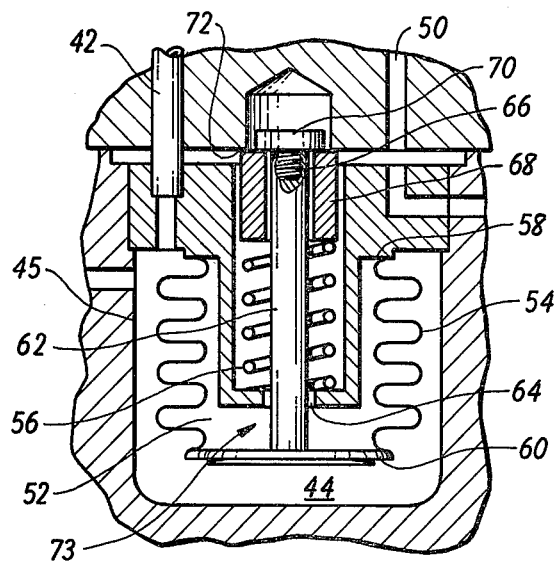
FIG. 2 is an enlarged view in partial cross-section of the overrange pressure protection apparatus of FIG. 1 showing the protection apparatus in its normal operating state.

Looking now at FIG. 2, the overrange pressure protection apparatus 14 utilizes a single preloaded bellows 54 and a preloaded spring 56. The preloaded bellows 54 is hydraulically sealed at one end with respect to a base or "ground" element 58. The other end of the bellows is hydraulically sealed to a plate 60. A movable rod 62, secured at one end to the bellows plate 60 extends upwardly, as viewed in FIG. 2, through an aperture 64 in the base element 58. The other end of rod 62 is threadably tapped to receive a screw 66.

In order to best understand the operation of the overrange pressure protection apparatus 14, the apparatus has been shown in FIG. 2 under normal operating conditions. Bellows 54 is precompressed so that it exerts a force $F_b$ downwardly through rod 62 as viewed in FIG. 2. This force is in turn transmitted to a free floating sleeve 68 through screw head 70 of screw 66. The precompressed spring 56, on the other hand, exerts an upward force $F_s$ on the free floating sleeve 68. By design, force $F_s$ is larger than force $F_b$. Thus, sleeve 68 is urged to rest against a stop 72 that is fixed with respect to the base of "ground" element 58. It will be appreciated that the preloaded spring 56, plate 60, rod 62, sleeve 68 and stop 72 collectively comprise a preloaded stop means 73 for the bellows 54.

In addition to resting against stop 72, the sleeve 68 also contacts the lower surface of the screw head 70. The stop 72 and the lower surface of the screw head 70 provide accurately defined seating surfaces for the free floating sleeve 68 thereby insuring an accurate and repeatable, reseating of the sleeve upon return from an overrange pressure condition. The accurate and repeatable reseating of the components is desirable in order to maintain a predetermined volume ratio between the high and low pressure fill fluid chambers 38 and 46. Variations in the fill fluid chamber ratio will produce calibration errors.

Figure 3:
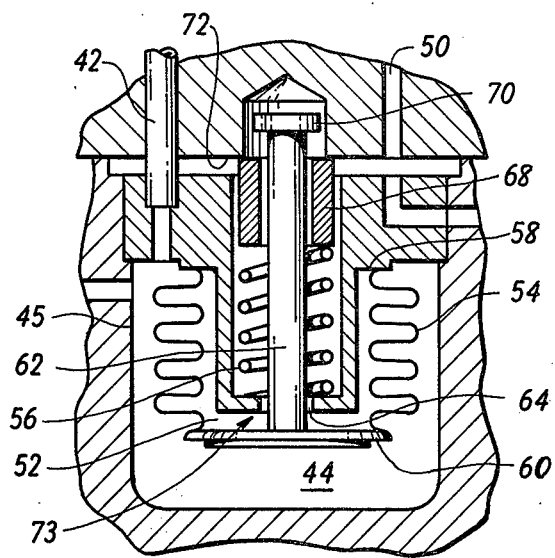
FIG. 3 is a view similar to that of FIG. 2, but illustrating the position of the overrange protection apparatus when exposed to a positive overrange pressure.

Referring now to FIG. 3, if a positive differential pressure is applied to the transmitter, the high pressure is transmitted through the high pressure isolation diaphragm 28 and the incompressible fill fluid (for purposes of clarity not shown in the drawings) to the high pressure side 44 of the protective apparatus 14 and to the external surface of bellows 54. Similarly, the low pressure is transmitted to the internal or low pressure side 52 of the bellows. By multiplying the positive differential pressure by the effective area of bellows 54, it is possible to calculate the force due to this pressure which acts against the precompression force $F_b$ in the bellows. Thus, as long as the pressure induced force is less than $F_b$, the bellows 54 remains undeflected. However, when this force increases above $F_b$ the bellows contracts and the screw head 70 separates from sleeve 68, as shown in FIG. 3. The bellows continues to compress with increasing positive differential pressure until the high pressure isolation diaphragm 28 seats against the back-up plate surface 30. At this point, no further fill fluid can be displaced from behind the isolation diaphragm and movement of the bellows ceases thereby limiting the differential pressure applied across the transducer to a safe value.

When the overrange positive differential pressure is removed, the compressed bellows 54 expands back to its normal, preloaded position as shown in FIG. 2. This action provides an automatic resetting of the protection apparatus after a positive differential pressure overrange condition. As mentioned previously, the lower surface of screw head 70 accurately and repeatably reseats itself with respect to sleeve 68.

Figure 4:
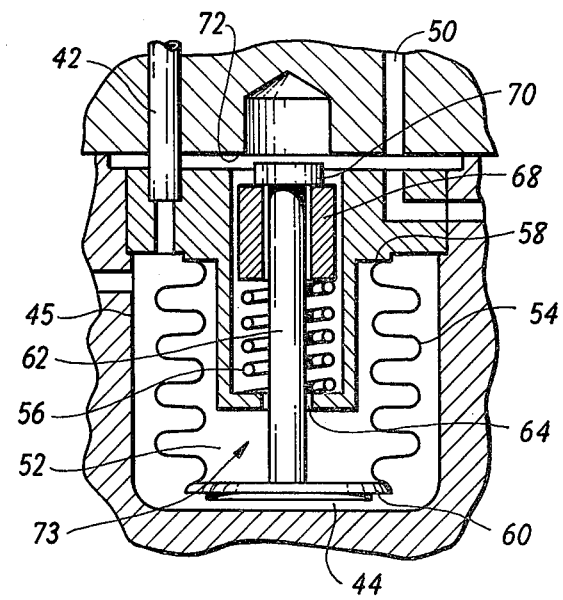
FIG. 4 is a view similar to that of FIG. 2, but illustrating the position of the overrange protection apparatus when exposed to a negative overrange pressure.

FIG. 4 illustrates the converse situation in which an overrange negative differential pressure is applied to the bellows 54. The bellows remain undeflected until the force induced on the bellows by the negative differential pressure is equal to the difference between the spring force $F_s$ and the bellows preload force $F_b$. Beyond this negative differential pressure, the bellows expands and unseats the free floating sleeve 68 from stop 72. Further expansion of the bellows produces a concomitant further compression of spring 56 as shown in FIG. 4. When the overrange negative differential pressure condition terminates, the now expanded bellows retracts to its normal, preloaded condition, as shown in FIG. 2, thereby providing an automatic and accurate resetting of the protective apparatus for a negative overrange differential pressure condition.

Figure 5:
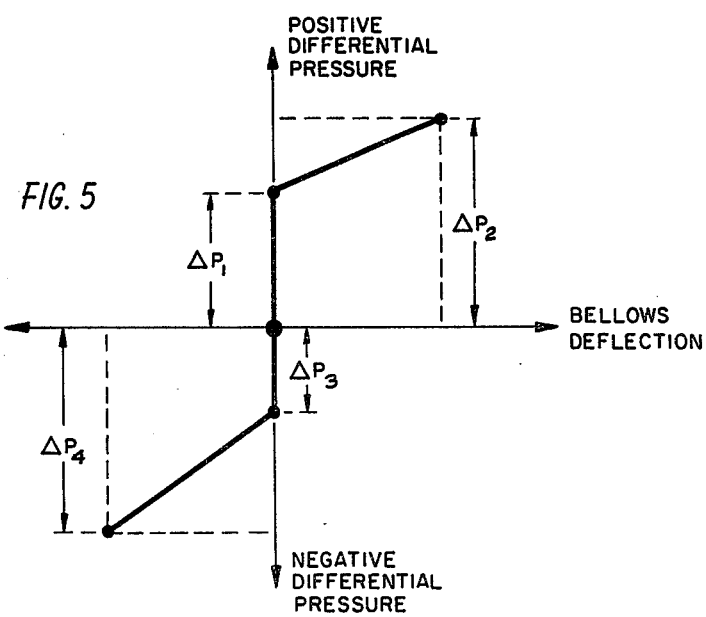
FIG. 5 is a graph showing the deflection of the bellows of the overrange protection device for positive and negative differential pressures.

FIG. 5 summarizes in graphic form the performance of the overrange pressure protection apparatus 14. The X axis represents the deflection of bellows 54 while the Y axis represents the differential pressure applied to the bellows. It can be seen from an inspection of FIG. 5 that the bellows 54 remains undeflected until a positive pressure $\Delta P_1$ is applied at which time the bellows compresses until the differential pressure $\Delta P_2$ is reached signifing the bottoming of the high pressure side of isolation diaphragm 28 against the back-up plate surface 30. The rate of increase of differential pressure with bellows compression is determined solely by the spring rate of the bellows and can be adjusted as desired. Thus, a lower spring rate reduces the differential pressure build-up beyond $\Delta P_1$ Similarly, the bellows begins to expand when a negative pressure differential exceeding $\Delta P_3$ is applied. The maximum negative differential is $\Delta P_4$ at which time the isolation diaphragm 34 on the low side bottoms out against the back-up plate surface 36. The rate at which the negative pressure increases with bellows expansion beyond $\Delta P_3$ is made up of the sum of the spring rates of both the spring and the bellows. This rate can be adjusted as desired. Additionally, by reducing the preload in the spring, $\Delta p_3$ can be reduced to a very small level if this characteristic is desired. Alternatively, $\Delta P_1$ can be reduced to a very small level if this characteristic is desired.

It will be understood from the preceeding discussion of the embodiment shown in FIGS. 1-4 that for a positive overrange differential pressure, the preloaded bellows is compressed while the preloaded spring remains unaffected. For the negative overrange pressure condition, both the spring and bellows are affected. The bellows is "expanded" i.e. the preload is relieved, while the spring is further compressed.

It will be appreciated by those skilled in the art that the specific embodiment shown in FIGS. 1-4 is but one example of a number of embodiments that will fulfill the objectives of the present invention.

Referring now to FIGS. 6-10, there are shown five other embodiments of the protective apparatus 14.

Figure 6:
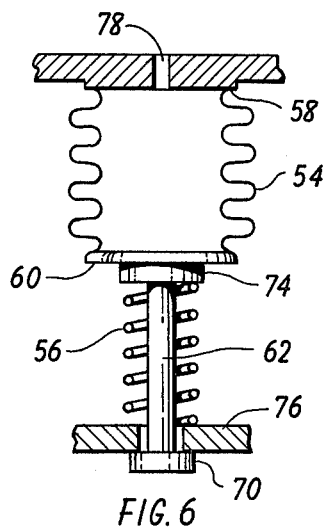
FIG. 6 is a diagrammatic view in partial section showing another embodiment of the overrange pressure protection apparatus in which both the bellows and spring are in compression at the null position.

FIG. 6 illustrates an embodiment in which the spring 56 is located outside of the bellows 54. As was the case with the embodiment shown in FIGS. 1-4, both the spring and bellows are in compression at the null position. The spring 56 exerts an upward force, as viewed in FIG. 6, against a plate 74 that is secured to rod 62. Plate 74 bears against the bellows plate 60. The upward movement of rod 62 is limited by screw head 70 contacting a stop 76. Pressure communication to the interior of bellows 54 is provided by passageway 78 through the base as "ground" 58.

When an overrange positive pressure is applied to the outside of bellows 54, the bellows are further compressed and plates 60 and 74 separate from each other. Note that in this condition the spring remains in the position shown in FIG. 6.

If a negative overrange pressure is applied to the outside of bellows 54, the bellows expands thereby further compressing spring 56. It will be appreciated that when the overrange pressure condition, either positive or negative, ceases, the protection apparatus automatically resets itself to the null position as shown in FIG. 6.

Figure 7:
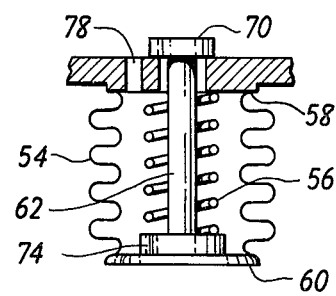
FIG. 7 is a diagrammatic view in partial section of still another embodiment of the overrange pressure protection apparatus in which the spring is in compression and the bellows is in tension at the null position.

Looking at FIG. 7, the embodiment depicted therein utilizes a different preloading configuration for the spring and bellows. In the FIG. 7 embodiment, the spring 56 is preloaded in compression while the bellows 54 is preloaded in tension at the null position. When a positive differential pressure is applied to the outside of bellows 54, the tension on the bellows is reduced while the spring becomes further compressed between the base or "ground" 58 and plate 74. In the converse situation with a negative differential pressure on the outside of bellows 54, the spring compression remains unaffected while the tension on bellows 54 is increased. As in the case with the embodiment shown in FIG. 6, the removal of the overrange pressure condition allows the spring and/or bellows to return to the normal preloaded condition at the null position, as shown in FIG. 7.

Figure 8:
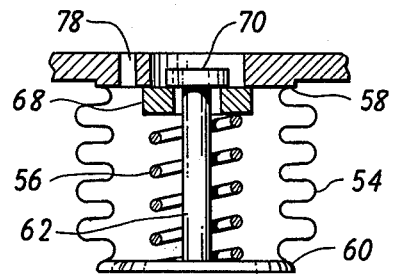
FIG. 8 is a diagrammatic view in partial section of a further embodiment of the overrange pressure protection apparatus in which the spring is in compression and the bellows is in tension at the null position.

FIG. 8 illustrates still another embodiment of the protective apparatus of the present invention in which the spring is preloaded in compression and the bellows is preloaded in tension at the null position. However, unlike the arrangement shown in FIG. 7, the preloaded spring 56 does not contact a base or "ground element" 58. In the FIG. 8 embodiment, spring 56 is precompressed between the bellows plate 60 and the free floating sleeve 68. In this embodiment a positive differential pressure on the outside of the bellows 54 will relieve the preload tension on bellows 54 while at the same time further compressing spring 56 between the bellows plate 60 and the free floating sleeve 68. The reverse condition of negative differential pressure on the outside of bellows 54 produces an increase in the tension on bellows 54, but does not affect the compression of spring 56. The removal of the overrange pressure condition automatically resets the protective apparatus to the null position shown in FIG. 8.

Figure 9:
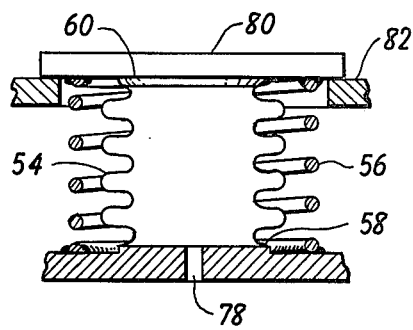
FIG. 9 is a diagrammatic view in partial section of a still further embodiment of the overrange pressure protection apparatus in which the spring is in tension and the bellows is in compression at the null position; and, FIG. 10 is a diagrammatic view in partial section of an additional embodiment of the overrange pressure protection apparatus in which both the spring and bellows are in tension at the null position.

Referring now to the embodiment shown in FIG. 9, spring 56 is located outside of bellows 54 and is in tension at the null position. The spring is secured to both the base 58 and a plate 80 by suitable means such as, by welding. The downward movement of spring 56, as viewed in FIG. 9, is limited by the contact of plate 80 with a stop 82. The bellows 54 is secured to both the base 58 and bellows plate 60 and is in compression at the null position.

When a positive overrange pressure is applied to the outside of bellows 54, the bellows 54 is further compressed while spring 56 remains unaffected. Compression of bellows 54 produces a downward movement of bellows plate 60 separating it from plate 80.

In the converse situation, a positive overrange pressure is applied through passageway 78 to the interior of bellows 54. This produces an expansion of the bellows i.e. a relief of the compressive preload on bellows 54 and a concomitant increase in the tension on spring 56 as plate 80 is forced upwardly away from stop 82.

Figure 10:
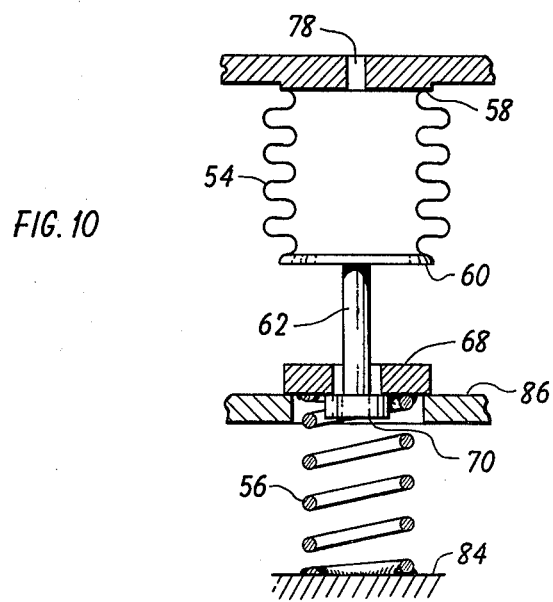

Referring now to FIG. 10, there is shown a further embodiment of the protective apparatus of the present invention in which both the sping and bellows are in tension at the null position. Bellows 54 is attached to the previously mentioned base 58 and plate 60. Rod 62, in turn, is secured to plate 60 with screw head 70 contacting the movable sleeve 68. Spring 56 is secured by welding or other suitable means to sleeve 68 and to a "ground" 84. As viewed in FIG. 10, downward travel of sleeve 68 is limited by a stop 86.

When a positive overrange pressure is applied to the exterior of bellows 54, the preload tension in bellows 54 is relieved while the preload tension in the spring 56 is increased by the upward movement of rod 62 as screwhead 70 bears against sleeve 68. When the opposite overrange pressure is applied to the interior of bellows 54 through passageway 78, the bellows expands moving rod 62 and screwhead 70 in a downwardly direction thereby increasing the tension in bellows 54. Note that the preload tension on spring 56 is not altered in this overrange pressure condition.

Having described in detail the preferred embodiments of my invention, it will now be apparent to those skilled in the art that numerous modifications can be made therein without departing from the scope of the invention as defined in the following claims.

What I claim and desire to secure by Letters Patent of the United States is:

1. An overrange pressure protection apparatus for a differential pressure transmitter having a transducer for producing an electrical output signal that is a function of the pressure differential applied thereacross, said overrange pressure protection apparatus comprising:
    (1) a housing having a central cavity with inlet means for applying a first and a second pressure signal across the transducer;
    (2) a bidirectionally deflectable, preloaded bellows means positioned within the central cavity of said housing and interposed between said first and second pressure signals;
    (3) a unidirectionally deflectable, preloaded stop means positioned within the central cavity of said housing, said stop means having a greater preload than said preloaded bellows means and being mounted with respect to said preloaded bellows means so that the preload forces therein act in opposite directions to produce an equilibrium position for the bellows and stop means over a predetermined range of differential pressures between said first and second pressure signals, said deflectable bellows and stop means both being deflected upon a first overrange pressure condition and only said bellows means being deflected upon a second and opposite overrange pressure condition; and,
    (4) means for preventing the differential pressure between said first and second pressure signals from exceeding a predetermined differential pressure.

2. The protection apparatus of claim 1 further comprising said bellows means and said stop means both being preloaded in compression.

3. The protection apparatus of claim 2 wherein said stop means includes a spring preloaded in compression.

4. The protection apparatus of claim 1 further comprising said bellows means and said stop means both being preloaded in tension.

5. The protection apparatus of claim 4 wherein said stop means includes a spring preloaded in tension.

6. The protection apparatus of claim 1 further comprising said bellows means being preloaded in compression and said stop means being preloaded in tension.

7. The protection apparatus of claim 6 wherein said stop means includes a spring preloaded in tension.

8. The protection apparatus of claim 1 further comprising said bellows means being preloaded in tension and said stop means being preloaded in compression.

9. The protection apparatus of claim 8 wherein said stop means includes a spring preloaded in compression.

10. The protection apparatus of claim 1 wherein said deflectable bellows and stop means both deflect in a first direction upon said first overrange pressure conduction and wherein said deflectable bellows means deflects in a second and opposite direction upon said second and opposite overrange pressure condition.

11. The protection apparatus of claim 1 wherein said deflectable stop means includes a preloaded spring having at least a portion thereof positioned within said deflectable bellows means.

12. The protection apparatus of claim 1 wherein said deflectable stop means includes a preloaded spring having at least a portion thereof positioned coaxially with respect to and outside of said deflectable bellows means.

13. The protection apparatus of claim 12 wherein said at least a portion of said spring surrounds said deflectable bellows means.

14. The protection apparatus of claim 12 wherein said at least a portion of said spring is axially spaced from said deflectable bellows means.

15. The protection apparatus of claim 1 wherein said means for preventing the differential pressure between said first and second pressure signals from exceeding a predetermined pressure comprises:
 (1) a first and a second isolation diaphragm;
 (2) a first and a second isolation diaphragm back-up plate, said back-up plates and corresponding first and second isolation diaphragms defining a first and a second fill fluid chambers, respectively;
 (3) a fill fluid in each of said fill fluid chambers;
 (4) means for coupling the fill fluid from said first fill fluid chamber to the exterior of said preloaded bellows means; and,
 (5) means for coupling the fill fluid from said second fill fluid chamber to the interior of said preloaded bellows means.

16. A method for providing overrange pressure protection for a differential pressure transmitter having first and second isolation diaphragms and corresponding first and second back-up plates that define first and second fill fluid chambers, respectively, a fill fluid in each of said fill fluid chambers, and a transducer fluidly connected in series between the fill fluid chambers for producing an electrical output signal that is a function of the pressure differential thereacross, said overrange pressure protection method comprising the steps of:
 (1) transferring upon a first overrange pressure condition at least a portion of the fill fluid in said first fill fluid chamber to a cavity containing:
  (i) a bidirectionally deflectable, preloaded bellows means fluidly connected in parallel with the transducer and in series between the fluid fill chambers; and,
  (ii) a unidirectionally deflectable, preloaded stop means positioned within said cavity, said stop means having a greater preload than said preloaded bellows means and being positioned with respect to said preloaded bellows means so that the preload forces therein act in opposite directions to produce an equilibrium position for the bellows and stop means over a predetermined range of differential pressures between first and second pressure signals applied to said first and second isolation diaphragms,
 said transferred fill fluid contacting the exterior of said bellows means and producing a deflection of said bellows means without producing a deflection of said preloaded stop means; and,
 (2) transferring upon a second and opposite overrange pressure condition at least a portion of the fill fluid in said second fill fluid chamber to the interior of said bellows means to produce a deflection of said bellows means and of said preloaded stop means.

17. An overrange pressure protection apparatus for a differential pressure transmitter having a transducer for producing an electrical output signal that is a function of the pressure differential applied thereacross, said overrange pressure protection apparatus comprising:
 (1) a housing having a central cavity;
 (2) first and second isolation diaphragms mounted with respect to opposite sides of said housing forming isolation chambers therewith, said isolation diaphragms receiving first and second pressure signals;
 (3) fluid passage means connecting said isolation chambers with said cavity;
 (4) a substantially incompressible fluid filling said cavity and said isolation chambers through said fluid passage means for transmitting said first and second pressure signals to said cavity;
 (5) a bidirectionally deflectable, preloaded bellows positioned within said cavity and interposed between said transmitted first and second pressure signals;
 (6) a unidirectionally deflectable, preloaded stop means positioned within said cavity, said stop means having a greater preload than said preloaded bellows means and being mounted with respect to said preloaded bellows means so that the preload forces therein act in opposite directions to produce an equilibrium position for the bellows and stop means over a predetermined range of differential pressures between said first and second pressure signals, said deflectable bellows and stop means both being deflected upon a first overrange pressure condition and only said bellows means being deflected upon a second and opposite overrange pressure condition; and,
 (7) said isolation diaphragms resting against said housing when said overrange pressure conditions exceed predetermined limits, thereby limiting said transmitted first and second pressure signals to a differential pressure level insufficient to produce a deleterious effect on said transducer.

* * * * *